United States Patent [19]
Rose et al.

[11] Patent Number: 5,343,212
[45] Date of Patent: Aug. 30, 1994

[54] (AOA/LBI) EMITTER RANGING METHOD AND APPARATUS

[75] Inventors: Conrad M. Rose, Dahlgren, Va.; Jeffrey J. Drude, Jessup, Md.

[73] Assignee: Litton Industries, Inc., Beverly Hills, Calif.

[21] Appl. No.: 992,965

[22] Filed: Dec. 11, 1992

[51] Int. Cl.$^5$ .............................. G01S 5/02; G01S 3/02
[52] U.S. Cl. ...................................... 342/424; 342/458
[58] Field of Search ............... 342/417, 423, 424, 458; 364/449

[56] References Cited

U.S. PATENT DOCUMENTS

| | | | |
|---|---|---|---|
| 3,935,574 | 1/1976 | Pentheroudakis | 342/424 |
| 4,638,320 | 1/1987 | Eggert et al. | 342/442 |
| 4,638,321 | 1/1987 | Drogin | 342/444 |
| 4,734,702 | 3/1988 | Kaplan | 342/424 |
| 4,788,548 | 11/1988 | Hammerquist | 342/458 |
| 5,189,429 | 2/1993 | Guard | 342/424 |

Primary Examiner—Gregory C. Issing

[57] ABSTRACT

An Angle of Arrival/Long Baseline Interferometer (AOA/LBI) passive ranging apparatus and method for emitter range determination can use any convenient airframe location for the two-antenna uncalibrated LBI baseline. This baseline has a theoretically unlimited length and does not require a specific SBI/LBI baseline ratio. Only a single initial AOA is required. Range partitions are formed along the single AOA. The emitter is assumed to lie in any of N range bins and the corresponding DOA (direction of arrival) unit vectors computed. Each of these DOA unit vectors is then used to predict the LBI phase differential and the N resolved LBI phases each drive a location estimator. The location estimator (filter) with consistent output provide the emitter range. The LBI range from these filters is used for subsequent DOA generation and ambiguity resolution.

11 Claims, 12 Drawing Sheets $\vec{u} = \cos e\, a\vec{i} + \cos e \sin a\vec{j} - \sin e\, \vec{k}$

EMITTER $r = \dfrac{v \cos a_2}{\Delta a}$ $v(t_2 - t_1)$

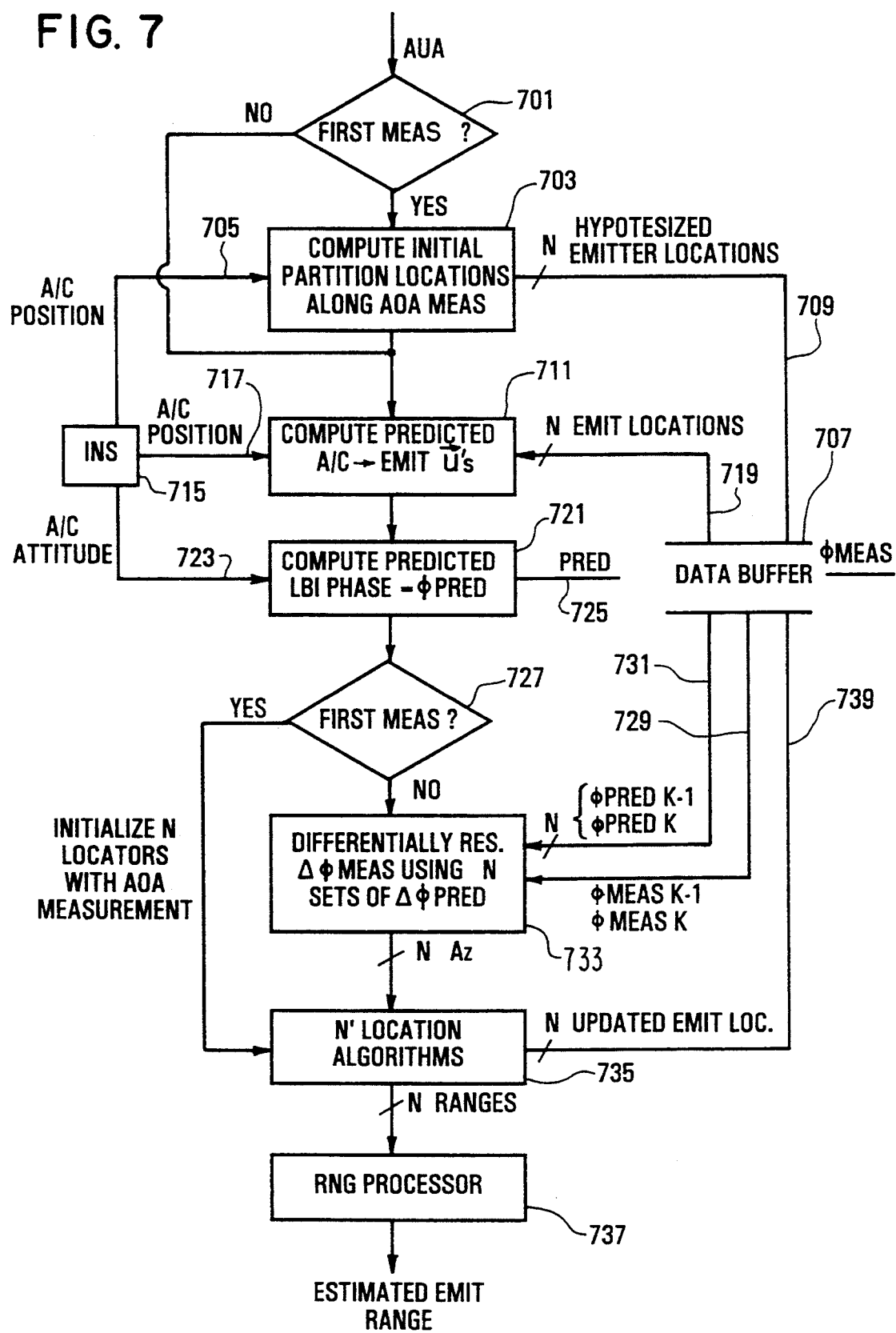

(AOA/LBI) EMITTER RANGING METHOD AND APPARATUS

BACKGROUND OF THE INVENTION

1. Field of the Invention

The present invention relates generally to locating emitters from a moving platform using RF interferometers. More specifically, it relates to accurate emitter ranging using a long baseline interferometer (LBI) and an initial angle of arrival (AOA) measurement.

2. Description of the Related Art

Several techniques have been developed using long baseline interferometers (LBI) to perform emitter ranging, as opposed to emitter geolocation or precision direction finding (DF) alone. As discussed in A. L. Haywood, "Passive Ranging by Phase-Rate Techniques" (Wright-Patterson AFB Tech. Report ASD-TR-70-46, December 1970), accurate ranging requires only the precise measurement of emitter bearing rate-of-change. This means that differential, not absolute, resolution of the long interferometer baseline is required, as described in Kaplan, U.S. Pat. No. 4,734,702.

A typical radio frequency interferometer system includes pairs of antennas in which an emitter is located by utilizing the phase difference of the signal arriving at two different antennas. However, the phase measurements of the interferometer can be emitter signal angle-of-arrival (AOA) ambiguous if the baseline of the antenna array, that is the separation of the two antennas used to measure signal phase, is greater than half the wavelength of the incoming signal. The number of ambiguous AOA's is closely approximated by the ratio of the interferometer baseline to the emitter wavelength and one key to successful emitter range estimation is to correctly resolve this ambiguity. A gross error is said to occur if the ambiguity resolution is done incorrectly.

However, as the interferometer baseline length increases, therefore increasing the number of AOA ambiguities, the phase measurement accuracy increases, and the rapidity of emitter ranging to the required accuracy improves due to the more accurate bearing measurements. Thus, the desire for accurate bearing measurements, requiring a long interferometer baseline, conflicts with the need for robust phase or AOA ambiguity resolution, which is easier to accomplish with a short baseline.

Although only two antenna elements are required to measure signal phase, conventional interferometer designs utilize additional antenna elements to control the gross error rate of a long baseline interferometer or LBI resulting from the inherent AOA ambiguity in phase measurement. One approach to doing this is disclosed in U.S. Pat. No. 4,638,320 by Eggert et al. Conventional techniques also require the system to include phase calibration to assure adequate phase tracking over the operational field of view (FOV) and bandwidth, and place significant constraints on frequency measurement accuracy. These make conventional systems designed for precision emitter ranging using RF interferometers both heavy and expensive, and therefore of limited utility.

One technique to overcome this complexity and weight is to use an AOA ambiguous long baseline interferometer or LBI. One approach to passive ranging utilizing an LBI which may have only two antenna elements is disclosed in Pentheroudakis (U.S. Pat. No. 3,935,574) which is incorporated herein by reference. This approach resolves the AOA ambiguities, which are identical to the antenna array grating lobes, by phase tracking the emitter signal during the relative motion of the platform containing the antenna array. "Lobe tracking" is utilized in which (2n) solutions are set up for an array with a length of n($\lambda$), where $\lambda$ is the emitter signal wavelength and n is an integer. Only one of the potential solutions converges to the true solution with the remainder being rejected as diverging. Phase tracking is continuously performed by a lobe tracking process in order to eliminate all but one of the potential solutions so that the ambiguity integer m, which determines the number of $2\pi$ cycles which must be added to the interferometer phase measurement to correctly identify the correct AOA, is determined.

The phase tracking approach has certain drawbacks. For instance, the signal can be interrupted by terrain blockage or intermittent emitter operation and the trend on the ambiguity integer m (phase tracking) is lost. Additionally, vibration can distort the trend and hinder correct ambiguity resolution. Observer attitude motion can cause large changes in the ambiguity integer, m. These changes are difficult to separate from translational motion relative to the emitter.

Another drawback to this phase tracking method is that the number of lobes, i.e. potential solutions, is determined by the ratio of $d/\lambda$, where d is the baseline length and $\lambda$ is the signal wavelength. At 18 GHz, with $\lambda=0.66''$, if $d=400''$, there are more than 600 ($d/\lambda$) potential solutions.

Another passive ranging approach utilizes a short baseline/long baseline interferometer or SBI/LBI system in which at least two SBI measurements separated in time are needed to resolve the two-antenna element LBI ambiguity. This approach is described in "Passive Ranging Method and Apparatus", (U.S. Pat. No. 4,734,702), by Kaplan, which is incorporated herein by reference and will be referred to subsequently as conventional SBI/LBI.

U.S. Patent No. 4,734,702 discloses two approaches utilizing SBI/LBI. One approach locates the target with SBI derived measurements and uses the SBI range to predict the LBI phase change. This approach requires some SBI location convergence before improving it with the LBI. The use of the SBI phase difference to initially compute a slant range means this method will not initially converge faster than a more conventional SBI-only system until a range accuracy sufficient to resolve the LBI has been achieved. In order to overcome this slow initial convergence to the range estimate, a second technique is used instead, if the slow initial convergence is intolerable.

This second technique utilizes the SBI unit direction-of-arrival vector (DOA) $\bar{u}$ to predict the LBI phase change. This technique does not require location to any accuracy before differentially resolving the LBI with sequential SBI measurements, and hence provides rapid convergence to an accurate range estimate. However, this SBI/LBI technique has the drawback of limiting the SBI/LBI baseline ratio, and requiring the use of a medium baseline interferometer (MBI) in many cases. It also requires a two dimensional (2-D) SBI to measure emitter direction of arrival or DOA, as opposed to just a one dimensional interferometer array measuring AOA.

The 2-D SBI is required because utilizing the change in SBI phase to predict the change in LBI phase requires generating the following DOA unit vector:

$$\vec{u}_{SBI} = \cos(e)\cos(a)\vec{i} + \cos(e)\sin(a)\vec{j} - \sin(e)\vec{k} \quad (1)$$

where
e = elevation angle measured by SBI,
a = azimuth angle measured by SBI, and
$\vec{i}, \vec{j}, \vec{k}$ correspond to x,y,z in FIG. 1.

The unit vector, $\vec{u}$, is required to predict the LBI phase change, $\Delta\phi^p_{LBI}$ at two different times $t_1$ and $t_2$ via the relation: where, $$\Delta\phi^p_{LBI} = \frac{2\pi}{\lambda}(\vec{d}_{LBI2} \cdot \vec{u}_{SBI2} - \vec{d}_{LBI1} \cdot \vec{u}_{SBI1}) \quad (2)$$

$\vec{u}_{SBI1}, \vec{u}_{SBI2}$ = unit SBI vectors at $t_1$, and $t_2$, respectively.
$\vec{d}_{LBI1}, \vec{d}_{LBI2}$ = LBI baseline vectors at $t_1$, and $t_2$, respectively.

The DOA unit vector, as opposed to just the AOA angle, is thus required because the LBI baseline changes its orientation in space with time.

The MBI is required because, in using the SBI phase measurements to predict the LBI differential phase, SBI non-constant errors, e.g. system thermal noise, are scaled up in the ratio of LBI to SBI baselines. If the SBI RMS phase errors are on the order of ten electrical degrees, the baseline ratio cannot be greater than 8:1 before another antenna is required. Therefore, if the desired range estimation performance requires an ultimate SBI-to-LBI baseline ratio of more than 8:1, an intermediate LBI, referred to as an MBI above, must be used. Thus, two or more additional antenna elements are required.

This baseline restriction on the SBI in relation to the LBI length arises in the SBI/LBI phase ambiguity resolution approach utilizing multiple SBI measurements as follows.

FIG. 2 shows a platform 20 moving between two points. At time, $t_1$ and $t_2$, SBI and LBI measurements are made from signals coming from stationary emitter 10. The angle Δa or azimuth bearing spread at the emitter is formed by the movement of the platform 20 at speed v relative to the emitter. For the purpose of this simple example, the range r, from the emitter 10 to platform 20 at time $t_2$ can be found from Δa by:

$$r = \frac{v\cos(a_2)}{\Delta a} \quad (3)$$

In practice, determining r represents a rather elaborate estimation problem. Equation 2 becomes, for this simple example:

$$\phi^m_{LBI2} - \phi^m_{LBI1} = \quad (4)$$

$$\frac{2\pi}{\lambda}d_{LBI}(\cos a_2 - \cos a_1) + 2\pi(n_1 - n_2) - \epsilon_{thermal}$$

where,
$d_{LBI}$ = baseline length $\phi^m_{LBI2} - \phi^m_{LBI1} = \Delta\phi^m_{LBI}$ is the measured phase difference between time $t_2$ and $t_1$,
which is related to the unknown bearing spread by the approximation:

$$\Delta\phi^m_{LBI} + 2\pi\Delta n = \frac{2\pi}{\lambda}d_{LBI}\sin(a)\Delta a \quad (5)$$

where $\Delta n = n_2 - n_1$. Δa can be found from equation 5 and substituted into equation 3 to get range, once the ambiguity integer Δn is determined. This "phase resolution" is carried out using the SBI phase measurements by solving for $$(\cos a_2 - \cos a_1) = \frac{\lambda}{2\pi d_{SBI}}[\Delta\phi_{SBI} + \epsilon_{SBI}] \quad (6)$$

to SBI accuracy. This is not accurate enough to give a solution for Δa providing rapid emitter location, but it is accurate enough to predict the unambiguous LBI phase by:

$$\Delta\phi^p_{LBI} = \frac{d_{LBI}}{d_{SBI}}[\Delta\phi_{SBI} + \epsilon_{thermalSBI}] + \epsilon_{thermalLBI} \quad (7)$$

Equation 7 is used to find Δn by adding $2\pi$ to the measured phase until the inequality $$|\Delta\phi^m_{LBI} - \Delta\phi^p_{LBI}| < \pi \quad (8)$$

is satisfied.

Note that the SBI errors are scaled up by a factor proportional to the ratio of the LBI to SBI baseline lengths in equation 7. This phase prediction error, as well as other errors due to antenna vibration-induced motion and inertial navigation system or INS inaccuracies, should have a numerical magnitude consistently less than $\pi/2$ radians. This crucial requirement limits the LBI-to-SBI baseline ratio $$\frac{d_{LBI}}{d_{SBI}}$$

which imposes undesired restraints on prior art systems.

This limitation on either how fast the range estimate converges or on the SBI/LBI baseline ratio, has proven to be a significant drawback in practical applications, since it severely restricts placement of LBI antennas. Current SBI/LBI installations tend to be awkward, require costly installation, and do not have the baseline length desirable for very rapid ranging.

Table 1 summarizes the features of the two conventional SBI/LBI techniques.

TABLE 1

| Elements in Conventional SBI/LBI | Technique | |
|---|---|---|
| | 1 | 2 |
| Sequential SBI Phase Measurements | Yes | Yes |
| SBI Range Required | Yes | No |
| Unit DOA vector generated sequentially from SBI phase measurements | No | Yes |

Differential phase resolution is utilized in both of these SBI/LBI approaches, so that the LBI baseline does not need to be calibrated, but the conventional schemes are very sensitive to SBI accuracy. It is desirable to have a system that is not limited by this sensitivity.

The baseline restriction existing in the conventional SBI/LBI approach necessitates the addition of more antenna elements to obtain the LBI baseline required to achieve the desired range accuracy quickly. However, the placement of the antenna elements is also restricted by the baseline constraint. This is a serious practical constraint on many air platforms. On tactical aircraft in particular, the placement of additional antenna elements are subject to airframe available space, which rarely coincides with the current SBI/LBI design limitations.

In both conventional SBI/LBI approaches, the SBI phase accuracy is critical because of the scaling of the SBI phase up to LBI to resolve the LBI phase ambiguity, as shown above, or to obtain an initial estimate of emitter range and thus predict the LBI phase needed to resolve the integer ambiguity, as also described in U.S. Pat. No. 4,734,702. Both approaches require sequential SBI measurements to be utilized in conjunction with sequential LBI phase measurements.

SUMMARY OF THE INVENTION

It is therefore one object of this invention to provide rapid convergence to accurate range estimates, but eliminate the SBI/LBI baseline ratio limitation. It is another object to provide LBI passive ranging, employing any convenient airframe location for the two-antenna uncalibrated LBI baseline, without the need for any elevation measurement. It is desired that the LBI baseline in this approach have a theoretically unlimited length and not require a specific SBI/LBI baseline ratio. Hence a medium baseline interferometer (MBI) is not required to support very large LBI baselines. Removing the baseline restriction eliminates the need for additional antenna elements and eliminates placement restrictions on tactical aircraft. Removing the need for an elevation measurement eliminates the need for a 2-D SBI, saving weight, cost and reducing system complexity.

A further object of the invention is to utilize only a single angle-of-arrival measurement, thus avoiding the necessity for sequential SBI measurements. Also, it is intended that any method of generating the AOA will suffice, rather than being limited to an SBI measurement.

Another object of this invention is to utilize a linear array of antenna elements measuring AOA to provide DOA, that is, to provide emitter azimuth and elevation without making elevation measurements and so eliminate the coning error associated with linear arrays without adding the additional antenna elements required to form a planar antenna array.

The invention is also intended to locate frequency agile emitters, since multiple baseline measurements extending over time are not required. Note that conventional SBI/LBI can be a monopulse system, but frequently is not because of the number of receiver channels required.

Viewed generally, the invention provides an AOA/LBI system which provides a more thorough and efficient exploitation than conventional SBI/LBI of the fact that bearings-only emitter ranging requires bearing rate-of-change measurements alone, and hence is independent of any constant biases present in the AOA measurements.

Other objects of the invention include avoidance of differencing noise-corrupted SBI measurements and avoidance of scaling up SBI thermal errors when predicting the LBI phase.

Further, this invention avoids the problems of large numbers of potential solutions with all but one of the solutions diverging, as occurs in the lobe tracking approach. Although the current invention does utilize a multiplicity of solutions, the number does not arise from "lobe tracking", nor is it in any other way a function of the LBI baseline length. The number of potential solutions utilized is largely an option of the system designer, within the restriction that will be discussed next.

In a preferred embodiment of this invention initial range partitions are formed along an initial AOA. Only one initial AOA measurement is required. Subsequent AOA estimates are generated within the system, for example in a processor. The emitter is assumed to lie in any of N range bins or partitions along the initial or measured AOA, and corresponding DOA unit vectors are computed. The number of range bins, N, determines the multiplicity of solutions that will be utilized. It is only restricted by the requirement that it result in at least one range partition that correctly resolves the LBI. In many applications N can be as small as 2.

The N initial range bins are related to the subsequent multiplicity of solutions as follows. The point at the center of each bin formed along the initial AOA is used to initialize a separate range estimator. An initial uncertainty estimate, or error variance, is also input to the estimator, associated with the individual range estimate. The bin-center points are also used to resolve the LBI measurements by generating N LBI DOA unit vectors, for example in software on a processor, as opposed to the sequential SBI measurements utilized by a conventional SBI/LBI systems. These unit vectors are of the same form given by equation 1

$$\bar{u}_p = \cos(e_p)\cos(a_p)\bar{i} + \cos(e_p)\sin(a_p)\bar{j} - \sin(e_p)\bar{k} \quad (9)$$

but now $a_p$ and $e_p$ are generated using the initial range partition, and subsequent range estimates of the emitter tracking filters. Note that the use of the range partitions means that an interferometer elevation array to produce a unit DOA vector is not required.

Each of these DOA unit vectors is then used to predict the LBI phase differential and the N resolved LBI phases each drive a location estimator. The phase is predicted by spatial DOA unit vector change consistent with the range hypothesis being used. An optimal estimator, e.g. a Kalman filter, outputs emitter range estimates for each partition. These ranges are provided to a processing block performing a Bayesian hypothesis test that weights the range estimates using well known statistical properties of the estimates. Thus, the multiplicity of range estimates are combined into one range estimate. The individual, rather than the weighted range estimates, are used for subsequent DOA generation and ambiguity resolution. Convergence to the correct range can occur for multiple initial range estimates, even if the original range hypotheses are very inaccurate. The range estimate is not further constrained to lie on the initial AOA after the range filter updates are begun.

Since the phase is predicted by doing a range-hypothesis which can be performed in software executed on a processor, the phase ambiguity does not require sequential SBI or other AOA measurements to predict LBI phase, nor does it require phase tracking. The predicted phase from the hypothesis test also allows separation of translational contribution to the ambiguity integer and phase measurement from airframe vibration contribution.

Increasing the interferometer baseline length, d, provides a robust way to speed emitter tracking filter convergence to emitter range. The techniques disclosed herein provide a means to increase the interferometer baseline length, d, without a significant increase in system weight and cost. No LBI baseline length limitations are imposed, other than those imposed by NAV accuracy.

Other objects and advantages of this invention will become apparent from the following description and accompanying drawings.

BRIEF DESCRIPTION OF THE DRAWINGS

FIG. 7 shows a flowchart of the instant invention.

DETAILED DESCRIPTION OF THE PREFERRED EMBODIMENTS

Figure 3A:
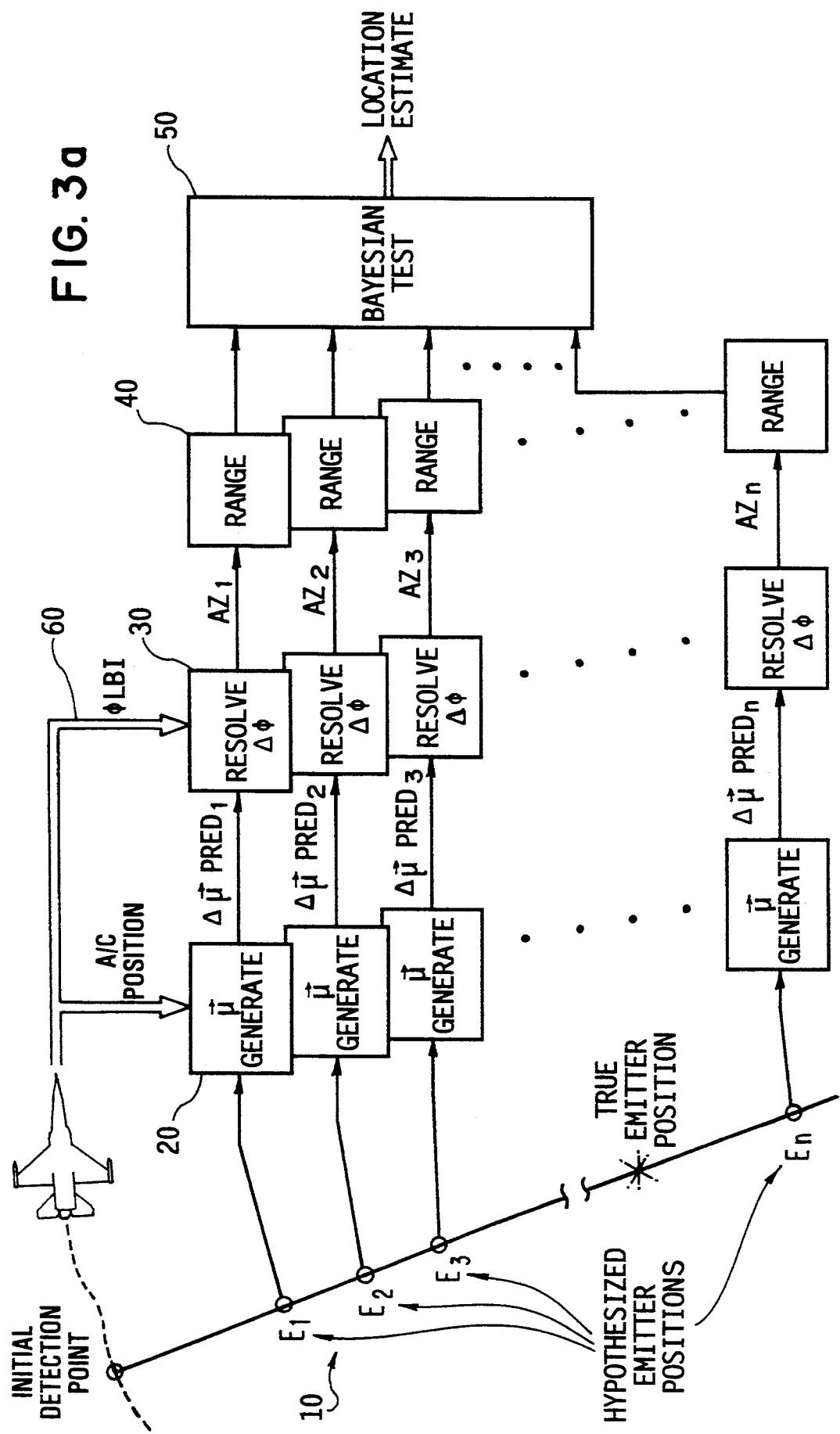
FIG. 3(a) shows a high level representation of the initialization of the instant invention.
Figure 3B:
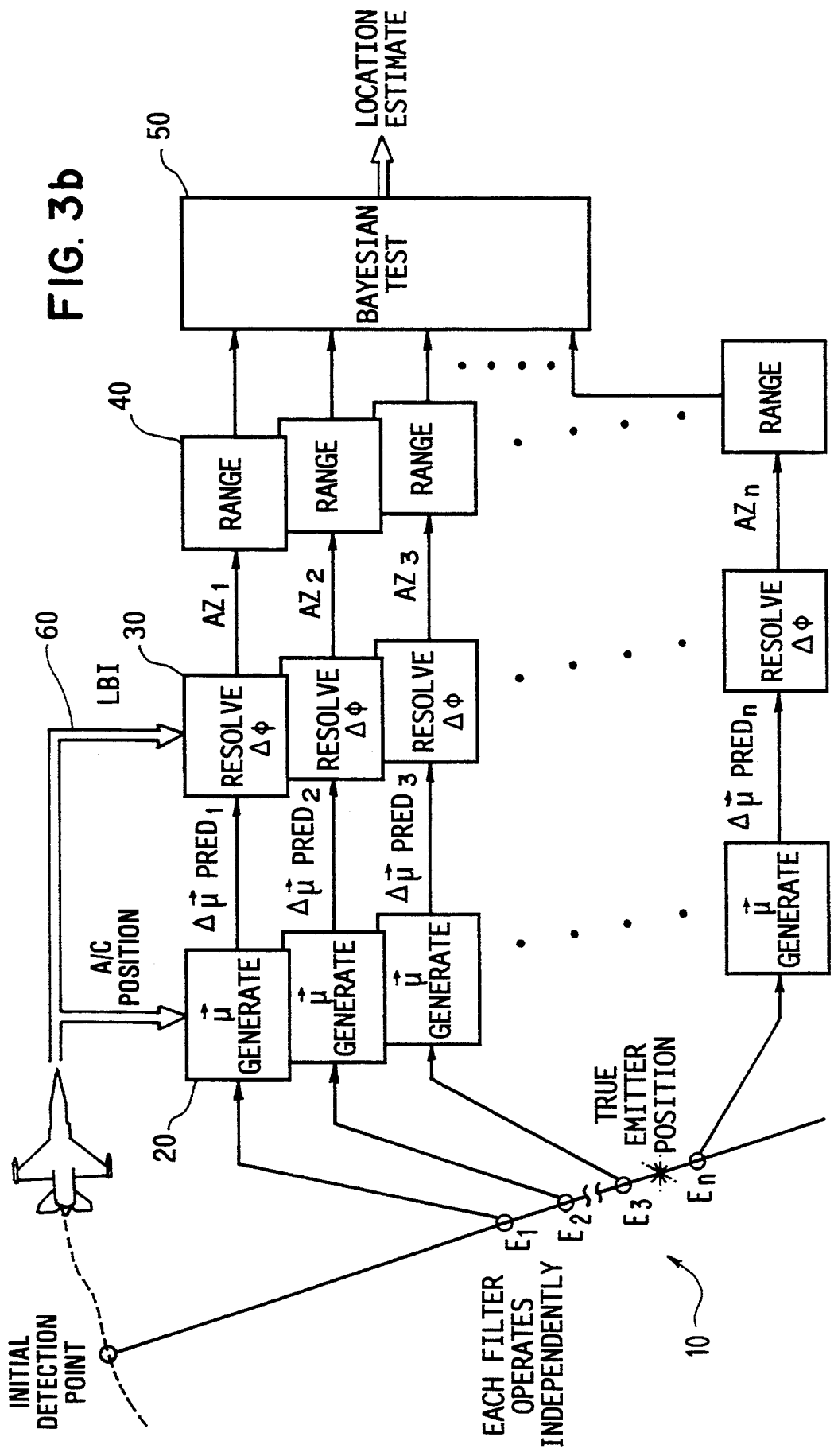
FIG. 3(b) shows a high level representation of the instant invention during convergence to the emitter range estimate. Note that the emitter positions change from the original partition.

According to the invention a method of determining an emitter range using a long baseline interferometer (LBI) 804a,b (see FIG. 8) includes determining a single angle of arrival (AOA) of an emitter signal with an AOA detection device in this case SBI antennas 801a,b and outputting an AOA signal to port/starboard switch 810. Next, using the AOA signal communicated via the switch 810 output from the AOA detection device 801, a plurality of initial range partitions is generated with each partition having an initial assumed emitter position E, ... En (FIGS. 3A and 3B) along the angle of arrival. The next step includes performing an initial prediction of phase change of the emitter signal between elements of the LBI based on the initial plurality of assumed emitter positions. This information is generated by a processor in a processing block 20 as shown in FIGS. 3A and 3B and the prediction signal is output to a phase resolver 30 which may be of conventional design. Sequential LBI phase changes are measured with phase change circuitry 806, which may also be of conventional design which receives emitter signals from the elements 804a,b of the LBI. Resolver 30 in FIGS. 3A and 3B differentially resolves each of the measured LBI phase changes with the predicted LBI phase changes and generates a plurality of resolved phase signals, thereby providing an azimuth for each of said partitions, at the outputs of the resolvers. At each measured phase change, a signal is generated representing an estimated emitter location for each of the assumed emitter positions.

Subsequently LBI phase changes for each said estimated emitter location are predicted using the estimated emitter location and the same phase change measurement circuitry 806.

The measured LBI phase changes are then differentially resolved with the subsequent LBI phase changes, again using resolvers 30 generating a new azimuth for each range partition. These steps of phase measurement, phase change prediction and phase resolution are then repeated, until a predetermined range criterion is met. A signal indicating a best range estimate as the emitter location from the plurality of estimated emitter locations generated using a hypothesis testing apparatus, such as a processor implementing a Bayesian test 50.

The overall ranging scheme, of the AOA/LBI approach used in a long baseline interferometer (LBI) apparatus according to the invention, shown in FIGS. 3(a) and (b), is described next.

Figure 4:
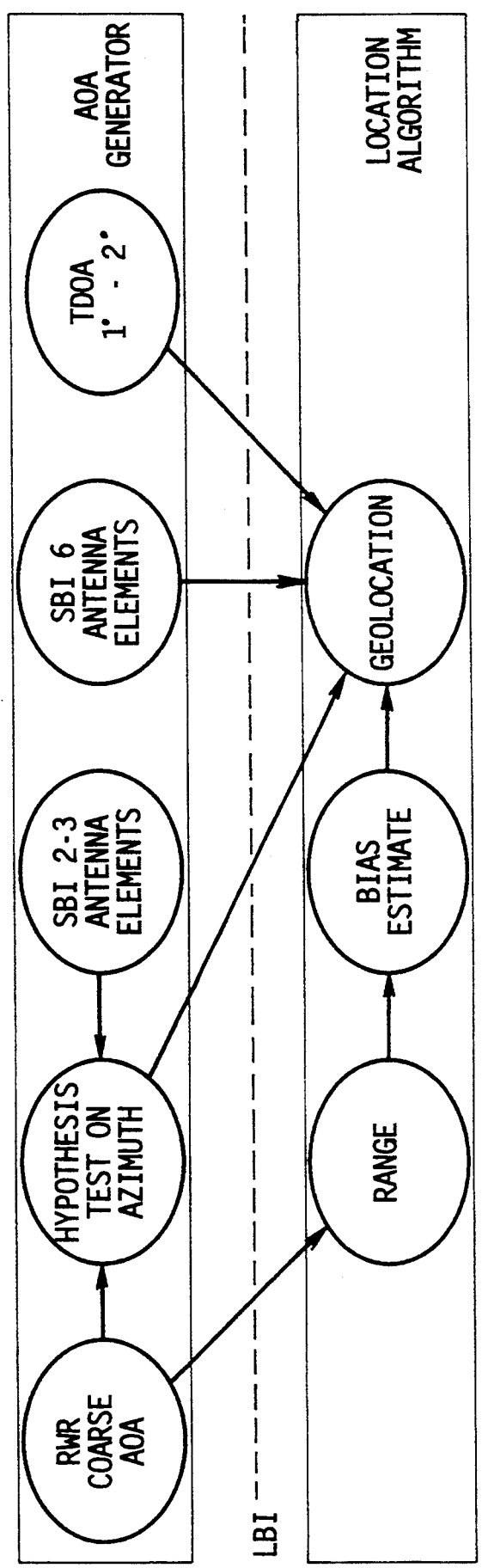
FIG. 4 shows possible AOA sources. The AOA approach is not limited to the use of an SBI.

The instant invention substitutes DOA unit vectors $\bar{u}$, which are generated by a processor, for those previously generated in prior art systems by sequential SBI measurements. These software generated unit vectors, e.g., $\bar{u}_1$ and $\bar{u}_2$, predict the LBI phase change by:

$$\Delta\phi = \frac{2\pi}{\lambda} (u_2 \cdot d_{LBI2} - u_1 \cdot d_{LBI1}) \qquad (10)$$

where the unit vectors are computed from the location hypothesis. Note that there is no scaling up of the errors with increasing baseline ratios in equation 10 as there is in equation 7, which deals with conventional LBI/SBI approaches. The DOA generation algorithm must be initialized by a single AOA measurement. The initial AOA measurement does not have to come from an SBI. It may come from a variety of sources, including amplitude DF measurements, an ambiguous SBI, or even an azimuth hypothesis test. Some of these possibilities are indicated in FIG. 4.

In contrast to conventional SBI/LBI systems, which require initial AOA measurement accuracy to within fractions of a degree, the initial AOA measurement of the AOA/LBI system of the invention, typically need only have an accuracy of several degrees. This initial AOA error introduces a bias in the estimated target bearing, but does not otherwise significantly affect the accuracy of the DOA rate-of-change calculation, as long as inequality 15 (discussed further below) is satisfied.

As shown by inequality 15, the DOA rate-of-change accuracy is impacted by the emitter position assumed in the DOA generation processing block 20. This is why a number of emitter positions are assumed along the initial AOA. Assuming a plurality of emitter positions is equivalent to assuming different emitter elevations, and hence an elevation array is not required. Each of the DOA unit vectors generated in processing block 20 is biased by the same initial AOA error, but the rate of change is different for each different range assumed. As a result, the sequential LBI phase measurements must be differentially resolved using DOA unit vector pairs associated with each range partition. A new unit vector is computed using the resolved LBI phases and previous range estimate from the corresponding optimal estimator, i.e. range tracking filter 40.

The LBI-generated unit vectors each drive the optimal estimator (range filter) 40 which utilizes the bearing rate-of-change. The range filters associated with correctly resolved LBI measurements rapidly converge to a stable range estimate consistent with the range partition used in generating the input LBI. This single LBI range and associated elevation can then be used alone, after convergence, for further ambiguity resolution and location, or the multiplicity of estimates may continue to be used, as shown in FIG. 3(b).

FIG. 3(a) shows the initialization approach of the invention. An initial measured angle of arrival is used to create N range partitions 10, shown as $E_1$ to $E_n$. The number of partitions created is restricted only by the requirement that at least one partition allow correct phase ambiguity resolution of the LBI.

Many realizations of emitter tracking filters known in the art tend to initially generate range estimates that are consistently too long. The initial range partition may be used to compensate for this problem by making the partition logarithmic, that is, establishing many partitions at shorter ranges and comparatively fewer at longer ranges. The n unit vector processing blocks 20 generate the unit vectors $\bar{u}_1$ to $\bar{u}_n$, one unit vector for each of n range partitions. Each unit vector processing block 20 outputs a predicted phase, $\Delta\phi_{pred}$, for its corresponding partition. The processing blocks 30 resolve $\Delta\phi$, the differential LBI phase measured at two two different times or two different points in space. Phase resolution uses the predicted phase and the measured LBI phases 60.

The LBI-generated unit vectors each drive an optimal estimator (range filter) 40. These utilize the bearing change measured by the LBI, as well as initial range estimates from the center points of the initial range partitions. FIG. 3(b) shows that the range filters associated with correctly resolved LBI measurements rapidly converge to a stable range estimate, consistent with the range partition used in generating the input LBI. This LBI range and associated elevation computed from the range estimate and known aircraft altitude are then alone used for further ambiguity resolution and emitter range estimation refinement with each individual filter that was established by the original range partition.

The range processing blocks 40 utilize a Kalman filter in the preferred embodiment. Other appropriate filters can be utilized, as will be appreciated by those skilled in the art. The output from the filter will depend on the desired function performed and the allowed error tolerance. This will vary for each application and platform. For instance, typical filter outputs will be a slant range to the emitter. Other possible outputs include emitter latitude, longitude, azimuth and elevation.

Each filter output is provided to processing block 50 which utilizes known statistical techniques to simultaneously evaluate the quality of the multitude of range estimates and to assign quality measures, such as probability likelihood functions to each estimate. For example, a weighted average may be computed by a Bayesian hypothesis test, such as that described by D. T. Magill, "Optimal adaptive estimation of sampled stochastic process", IEEE Trans. Automatic Control, vol. AC-10, October, 1965. This average is the optimal emitter range estimate, and this range estimate is output for system utilization.

Yet another approach is to use the theoretical statistics of the optimally performing Kalman filter to chose the correct range estimate. The properties of these statistics are well known, and means for estimating them in real-time are described in R. K. Mehra, "On the Identification of Variances and Adaptive Kalman Filtering", IEEE Trans. Automatic Control, vol. AC-15, April 1970. The performance results shown in FIGS. 6(a) and 6(b) indicate many of the tracking filters established by the initial range partition will exhibit near optimum statistics, making the choice of the correct range estimate straight forward.

The range estimating process can further be utilized in a novel way to correct for emitter azimuth coning error, even when elevation is not measured and before the emitter is located. When an SBI is used to generate the initial AOA, an accurate DOA can be provided by using initial estimated location bounds to provide an elevation estimate in order to generate true azimuth. Equation (15) indicates there will be a minimum and maximum range partition between which the LBI is correctly resolved. These partitions bound the emitter elevation, and elevation assumed at the radian of the minimum and maximum range bounds thus found from the resolution process is accurate enough to cone-correct AOA to get DOA before the estimator has actually converged to an accurate range estimate. Hence, cone-correction is provided by the process of resolving the LBI, and could actually occur independently of providing emitter location. If another AOA generator such as shown in FIG. 4 is used, accurate elevation and azimuth can still be generated when a terrain map is available, by applying techniques similar to those described in C. A. Baird, N. Collins, and M. Drew, "Terrain-Aided Navigation and Target Acquisition on the AFTI/F-16", 48th NATO/AGARD Guidance and Control Symposium, Lisbon, Portugal, May 1989.

L. H. Wegner, "On the Accuracy Analysis of Airborne Techniques for Passively Locating Electromagnetic Emitters", Report R-722-PR, Rand Corp, 1971, establishes the lower bound on the emitter range estimate error theoretically attainable. An approximation to the result in Wegner, specialized to ground-emitter passive location using an interferometer, is:

$$< \frac{\Delta r}{r} > \geq \qquad (11)$$

$$\sqrt{\frac{12}{n}} \left(\frac{1}{\Delta a}\right)\left(\frac{\lambda}{2\pi}\right)\left(\frac{1}{d\cos(AOA_{AVG})}\right)\left(\frac{1}{\sqrt{SNR_a}}\right)$$

where, $$< \frac{\Delta r}{r} >$$

= square root of the range error variance normalized by true range, n = number of DOA samples used in the location estimate, $\Delta a$ = change in bearing or DOA between initial and final bearing measurements, d = interferometer baseline length, SNR = receiver signal-to-noise ratio, and cos (AOA$_{avg}$)=average interferometer off-boresite factor.

Thus, range estimate accuracy is a function of intercept geometry and emitter characteristics. In most tactical scenarios, no practical means are available for controlling or optimizing most of the parameters in equation 11. The number of samples, n, cannot be increased indefinitely by raising the sampling rate because of error correlation effects that arise at faster sampling rates. SNR improvement requires costly receiver calibration, and provides limited benefit for the complexity and time involved. Therefore, increasing the interferometer baseline length, d, is the only system parameter available that provides a generally robust way to speed convergence to emitter range. The instant invention is an LBI approach that provides a means to increase the interferometer baseline length d without a significant increase in system weight and cost. The improved angular resolution obtained from the increase in baseline is limited only by NAV system errors.

Figure 1:
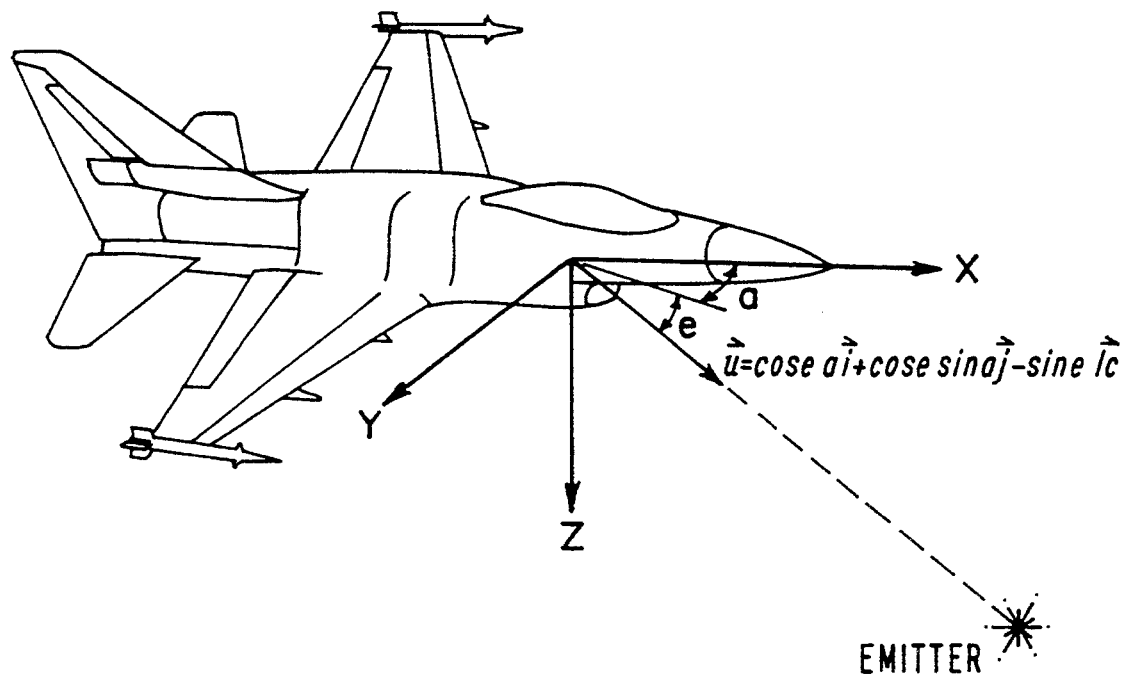
FIG. 1 shows the local level reference frame typically used to report the range estimate; it also illustrates the definition of emitter azimuth and elevation, and the DOA unit vector in that coordinate system.
Figure 2:
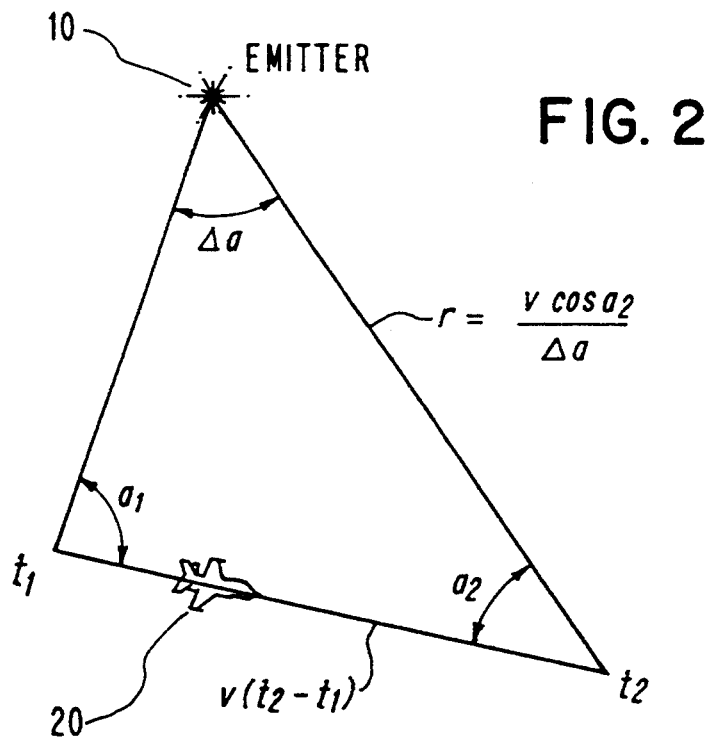
FIG. 2 shows the relationship of the SBI/LBI platform to the stationary emitter source at two points in time and illustrates the variables entering into the LBI determination of range.

Emitter direction finding (DF) requires generating the emitter direction-of-arrival (DOA) unit vector $\bar{u}$, which is a function of emitter azimuth and elevation relative to the observing platform, as shown in FIG. 1. A single linear interferometer measures AOA, not DOA. That is, antenna elements lying on a linear interferometer baseline $\bar{d}$ measure the phase $\phi$ of an incoming signal with wavefront normal, given by the DOA unit vector $\bar{u}$ according to $$\phi = \frac{2\pi}{\lambda} \bar{d} \cdot \bar{u} = \frac{2\pi}{\lambda} d\cos(AOA) \quad (12)$$

Two interferometer measurements along non-collinear baselines are thus typically required to measure DOA, that is, to determine true azimuth, a, and elevation, e, in the equation:

$$\bar{u} = \cos(e)\cos(a)\bar{i} + \cos(e)\sin(a)\bar{j} - \sin(e)\bar{k} \quad (13)$$

If only one interferometer baseline is used, an error in measuring true azimuth, known as the coning error, results. This error leads to a statistical relation between true azimuth measurement accuracy, $\sigma_{az}$, and the phase error, $\sigma_{100}$, approximated by:

$$\sigma_{az} = \frac{\lambda}{2\pi d} \frac{\sigma_\phi}{\cos(e)} \quad (14)$$

Thus, the coning error can be quite large at significant emitter elevations when only one interferometer baseline is used. However, measuring phase on multiple interferometer baselines is costly and complex because of the number of receiver channels typically needed. To reduce this complexity, the receiver channels measuring phase may be switched from one baseline to another. However, if the signal is not present during the entire measurement process, DF systems with multiple baselines may still not make enough independent AOA measurements to generate DOA.

The invention generates hypothetical AOA signal phases via the multitude of range filters. As shown in FIGS. 3a and 3b, each range filter generates emitter DOA from emitter AOA measurements made with a single linear interferometer baseline. Therefore, the coning error is corrected without using multiple receiver channels, or channel switching, and without using multiple interferometer baselines. As a result, true azimuth is produced with much reduced system complexity, cost and weight.

Thus, according to the principles of the range estimating process described above the invention includes a method for generating emitter true azimuth when only single AOA measurments are made. In this case a plurality of pseudo elevation measurements are generated. These pseudo elevation measurements are combined with AOA measurments to obtain a set of candidate true or cone corrected azimuths and processing is performed to find the correct, true azimuth from this set.

FIG. 5 illustrates the advantage that the AOA/LBI system of the invention provides over prior art SBI/LBI approaches in removing the limitation on the LBI antenna's placement. An SBI is used with the LBI in the cases illustrated in FIGS. 5(a)–(c). With the conventional SBI/LBI, it is used at every LBI update, but with the AOA/LBI it is used only at the first LBI update.

Figure 5A:
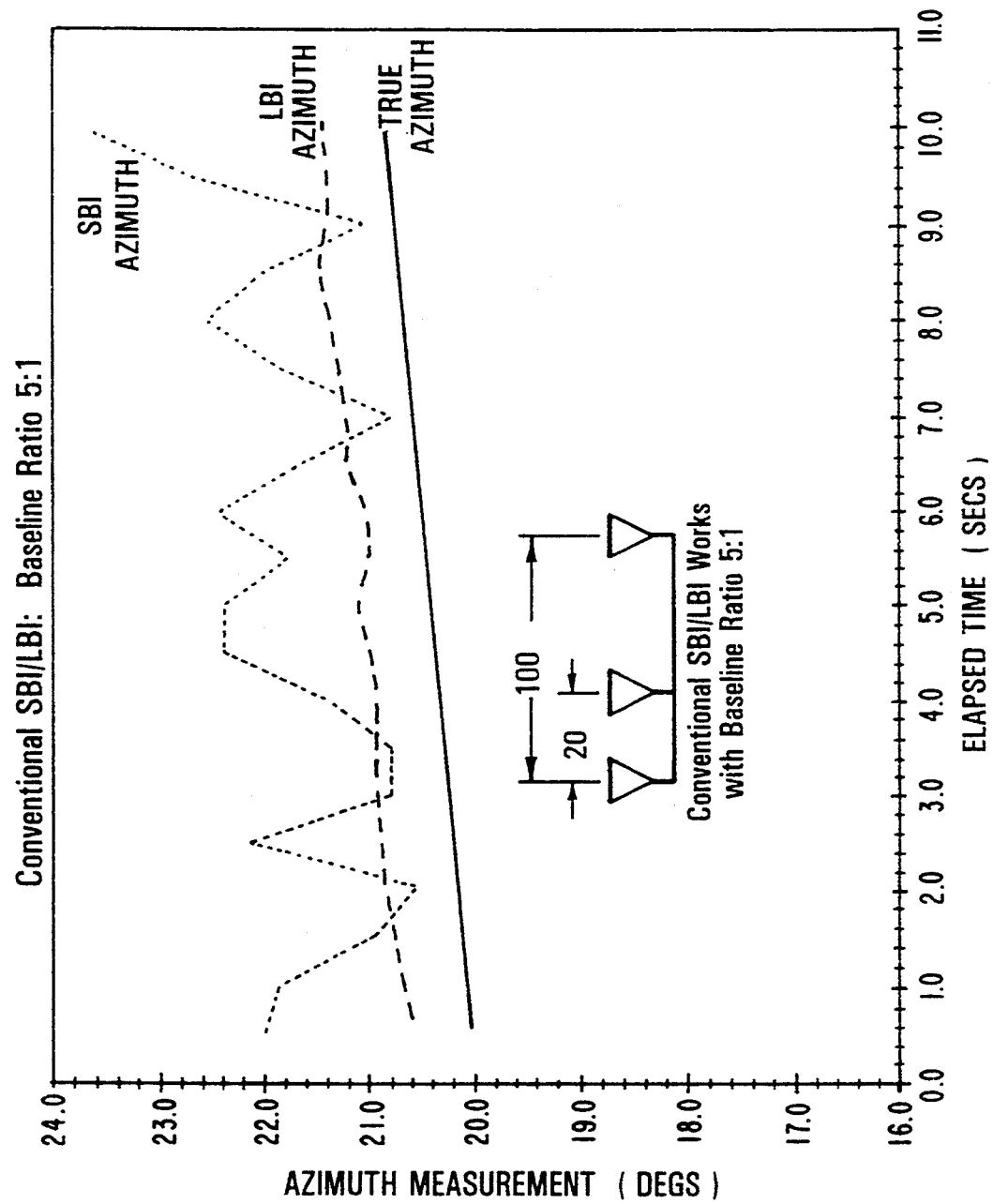
FIGS. 5(a)-5(c) compare the performance of various SBI/LBI and AOA/LBI baseline ratios.
Figure 5B:
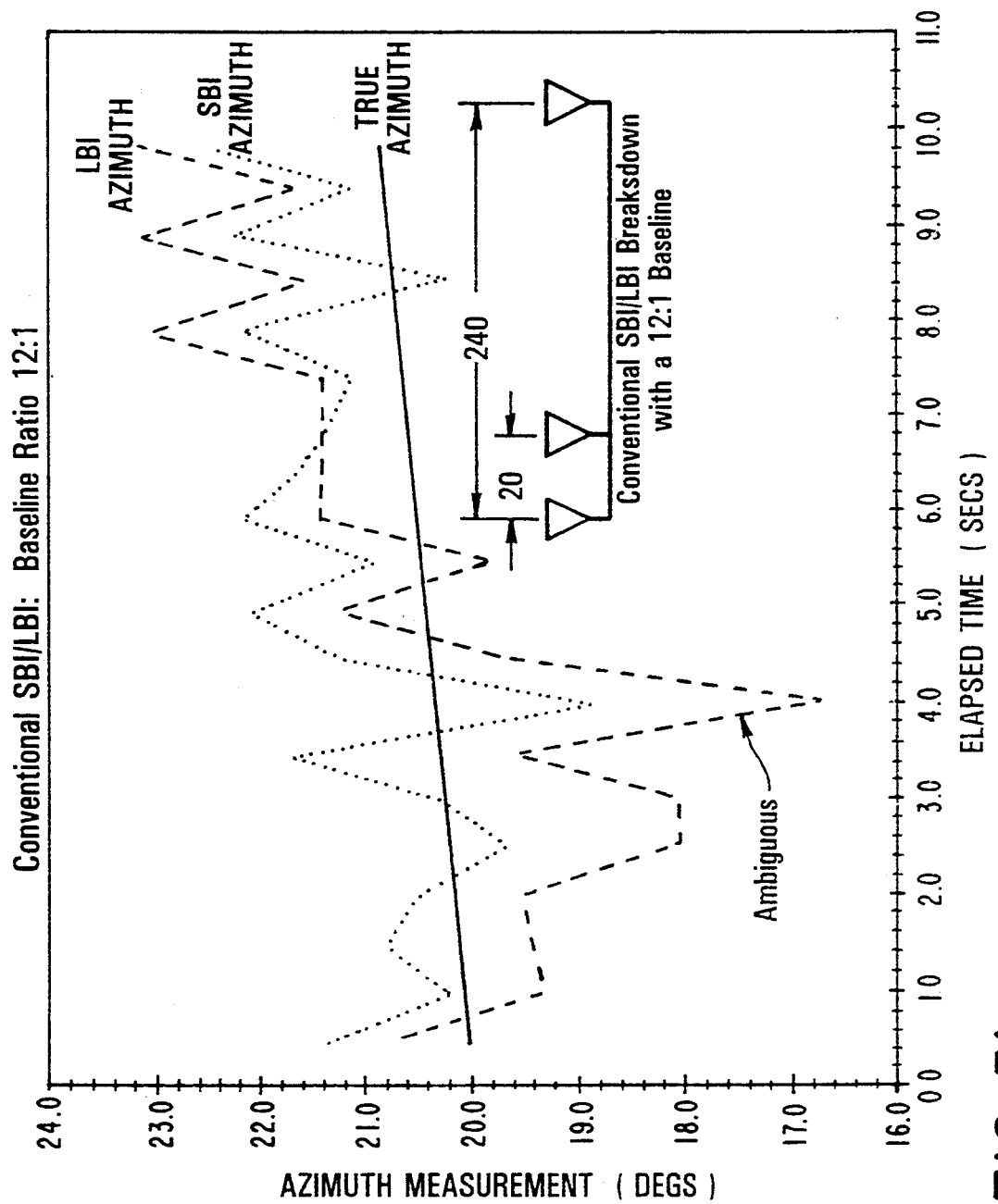
Figure 5C:
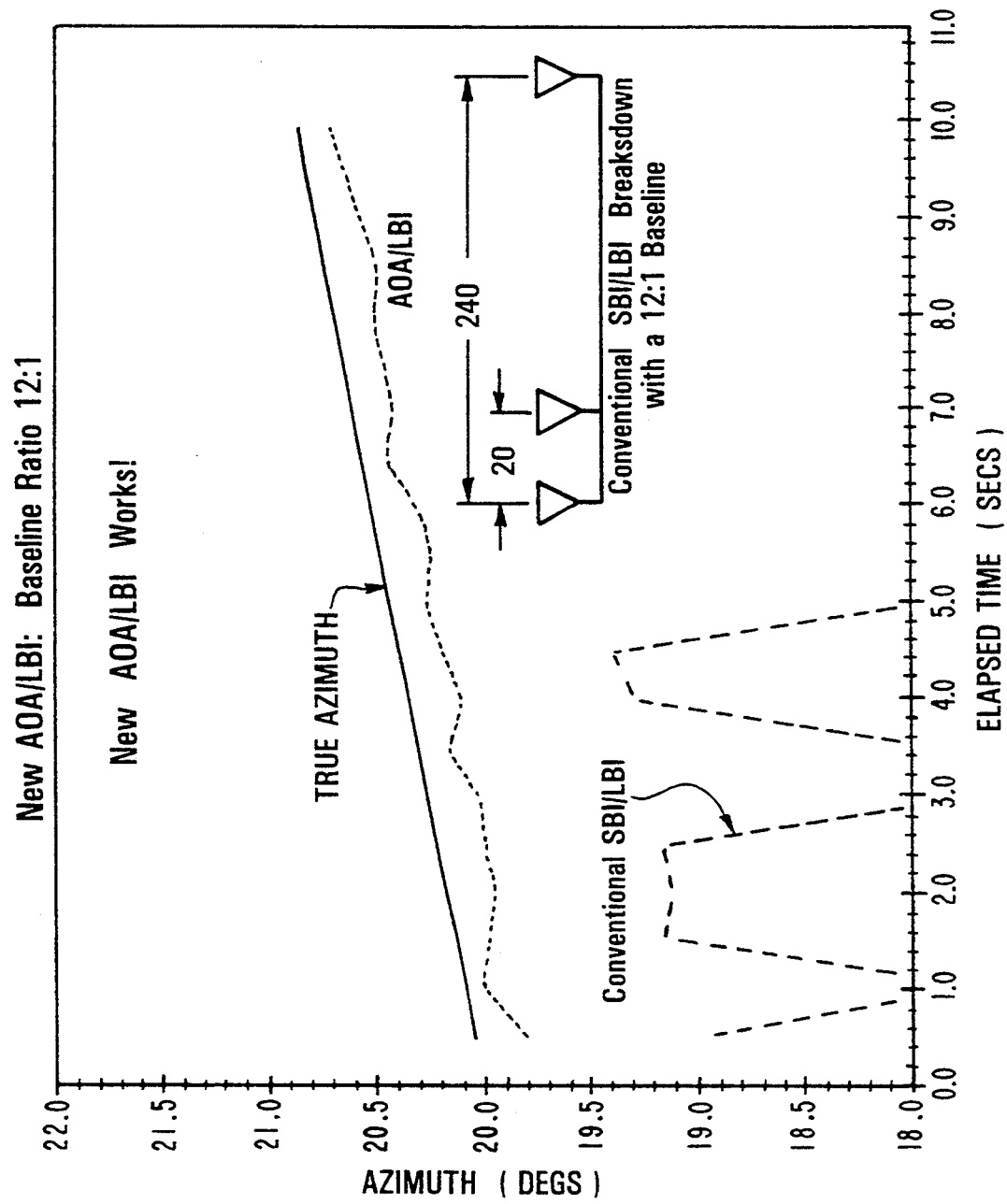

For the fixed scenario indicated in FIG. 5(a), the conventional SBI/LBI approach correctly resolves the LBI when the baseline ratio is 5:1. However, as illustrated in FIG. 5(b), when the ratio is 12:1, SBI/LBI does not work. A 12:1 ratio could be required, for example, if the current radar warning (RW) pod is to be used for the LBI antenna mount on some tactical aircraft. In contrast to the limited capabilities of conventional SBI/LBI systems, the AOA/LBI system of the invention correctly resolves the longer baseline (12:1) as shown in FIG. 5(c).

Figure 5D:
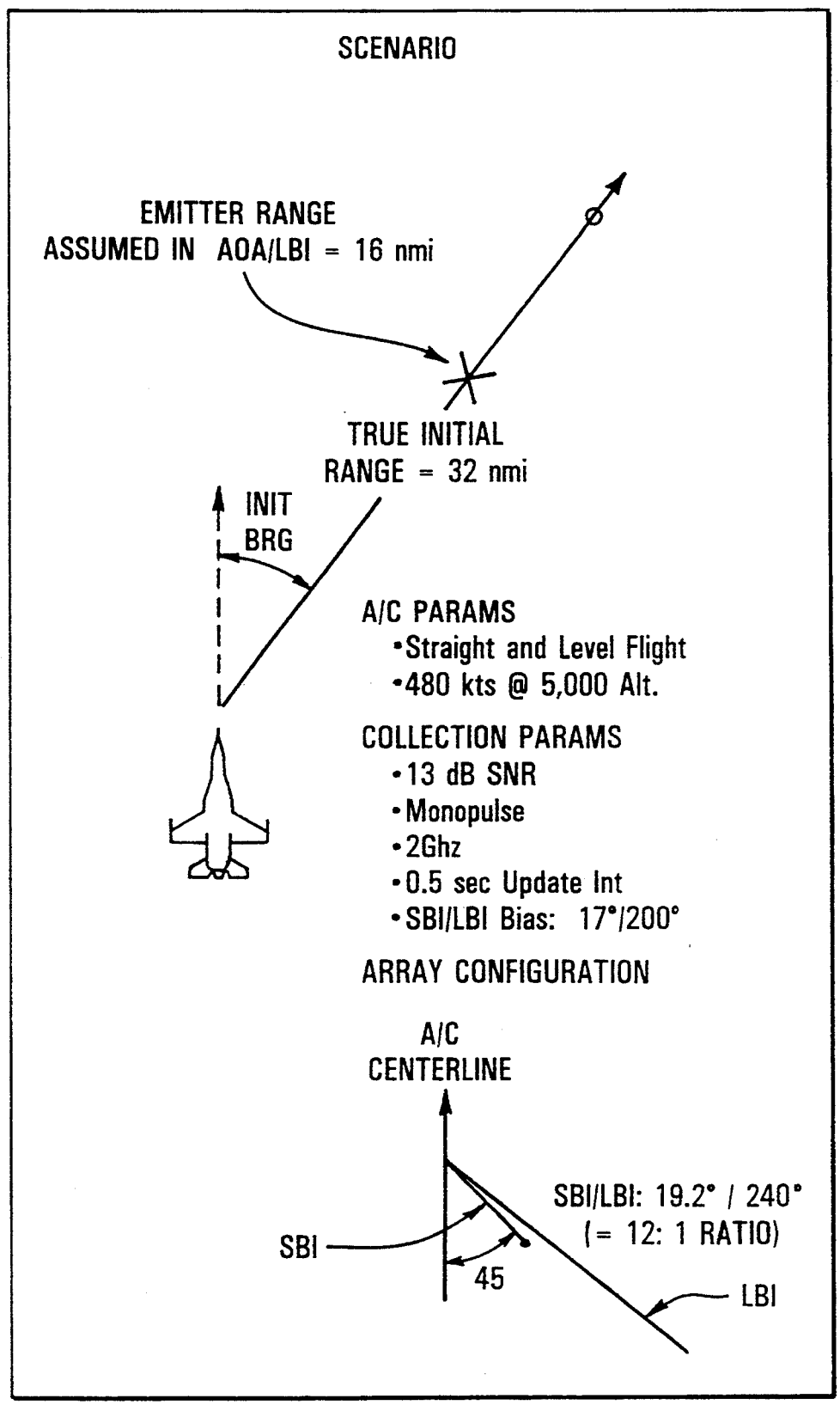
FIG. 5(d) shows the assumed scenario used to generate performance results.

FIG. 5(d) illustrates the scenario in which only two range partitions where used, with the emitter hypothesized to be at 16 nmi, while it was actually at 32 nmi. Thus this scenario indicates the AOA/LBI system of the invention correctly resolves the LBI even with a 50% range error.

One fundamental concept that is exploited in this invention is insensitivity to initial AOA error, i.e., constant measurement bias, in the differential LBI ranging scheme. This occurs at two levels, ambiguity resolution and range estimation. First, the ambiguity resolution for the LBI unit vector generation that drives the location processing depends primarily on angle rates of change. Secondly, although the resulting DOA unit vector is biased, the range estimate that is driven by this biased input also primarily depends on rate of change.

A second fundamental concept is the insensitivity of LBI angular resolution accuracy to the accuracy of the predicted differential phase. The predicted phase need only be accurate enough to resolve the integer ambiguity of equation 4. Thus, a number of assumed ranges along the initial AOA extending from the aircraft to the radar horizon are used to predict the LBI phase change and this range partition can be fairly coarse and nonuniform as shown e.g. in FIGS. 6(a) and 6(b). In fact any deviation $\Delta r$ from the true range $r_t$ will resolve the LBI integer ambiguity provided:

$$\frac{r_t}{1 - \frac{d}{\lambda} \Delta a \sin(a + a)\left[1 - a\cos(a)\frac{v_\perp \Delta t}{r_t}\right]} \geq \Delta r \geq \quad (15)$$

$$\frac{r_t}{1 + \frac{d}{\lambda} \Delta a \sin(a + a)\left[1 - a\cos(a)\frac{v_\perp \Delta t}{r_t}\right]}$$

where, $\bar{a}$ = fixed DOA bias,
a = true emitter bearing,
v⊥ = velocity component perpendicular to emitter bearing,
Δt = update time between measurements,
Δa = bearing change at the emitter over the update time, and
d = interferometer baseline length.

Figure 6A:
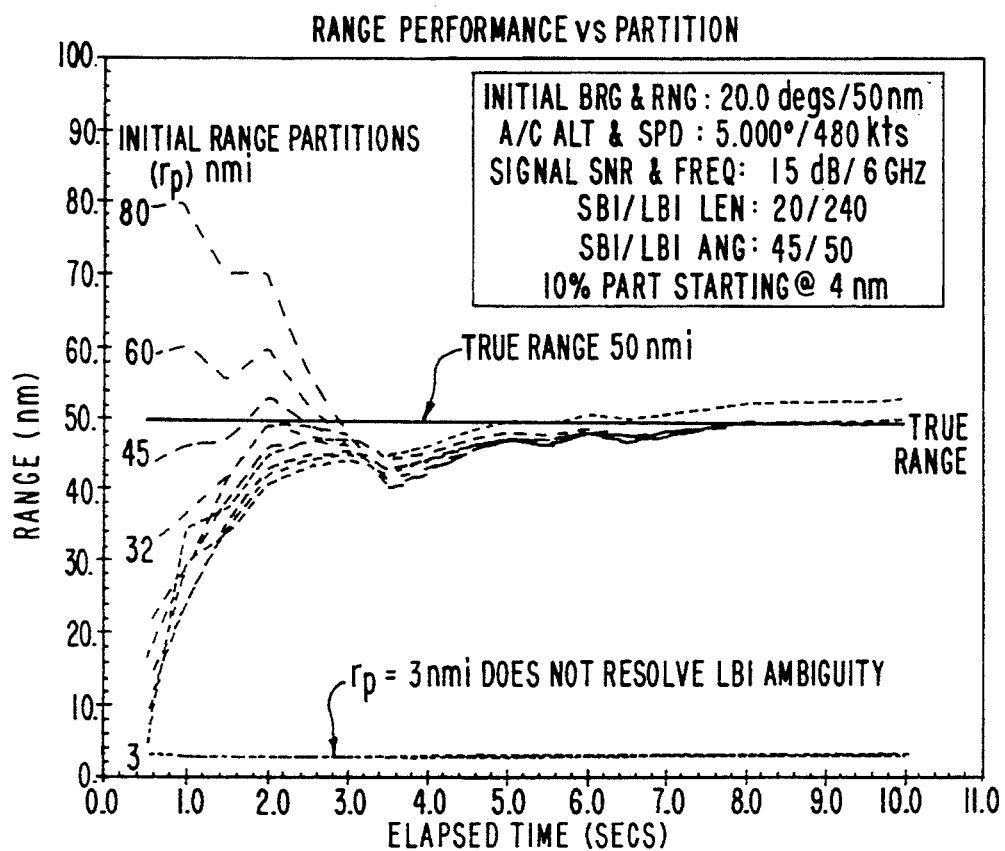
FIG. 6(a) shows the range convergence of various initial range partitions for an emitter located approximately half way between the sensor platform and the radar horizon.
Figure 6B:
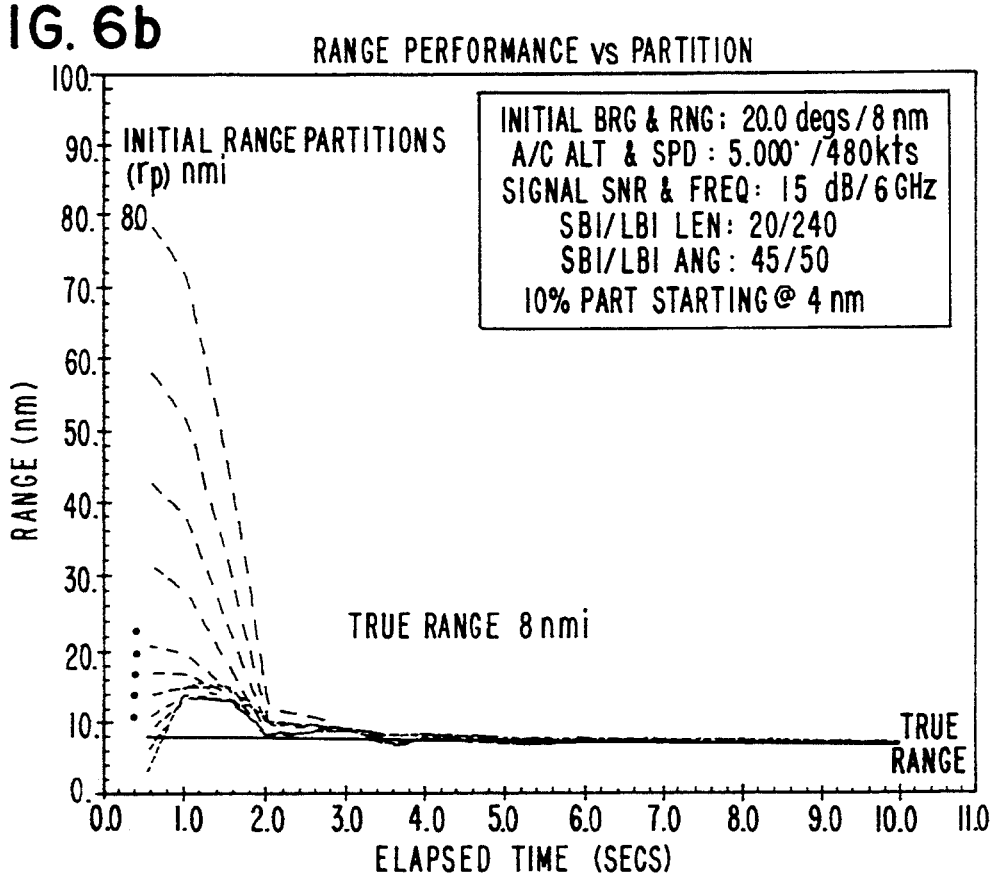
FIG. 6(b) shows the range convergence of various initial range partitions for emitter close to the sensor platform.

This allows many of the multiplicity of range estimates to converge to the correct range estimate, as shown in FIGS. 6a and 6b.

A third fundamental concept exploited by the instant invention is the sensitivity of the LBI angular accuracy to correct ambiguity resolution. This means that performance of the range filters driven by the LBI DOA unit vectors resolved by different predicted range estimates can be used to determine which ambiguity resolution was correct. The preferred means for making this determination is an optimal estimator, such as a Kalman filter. Thus an initial range partition at 3 nautical miles (nmi) shown in FIG. 6(a) consistently generated the wrong ambiguity integer when resolving the LBI and hence caused the corresponding filter to diverge. This behavior is detectable in real time using the statistical characteristics of the Kalman filter.

The invention also provides a method for separating antenna vibration-induced phase error from sensor translational and rotational motion. To accomplish this a plurality of possible LBI phases are generated. These phases are compared with actual measured LBI phases and random phase changes are separated from systematic phase changes in performing this comparison.

Performance was simulated to illustrate key aspects of the invention.

FIGS. 6(a) and (b) indicate AOA/LBI's ambiguity resolution performance in calculating slant range of an emitter, as a function of the range partition. The scenario is the same as that shown in FIG. 5(d). When the range error is so large that the LBI ambiguity integer cannot be found, the results are erratic and easily detectable. FIG. 6(a) shows the range convergence of various initial range partitions for an emitter located approximately half way between the sensor platform and the radar horizon. The initial range partition of 3 nmi fails to resolve the ambiguity. However, the remainder of the partitions successfully resolve the ambiguity.

FIG. 6(b) shows the range convergence of various initial range partitions for an emitter close to the sensor platform.

FIGS. 6(a) and 6(b) show that many range partitions produce the correct ambiguity integer, consistent with inequality of equation (15). All range partitions that correctly resolve the LBI converge to the correct range estimate.

Figure 6C:
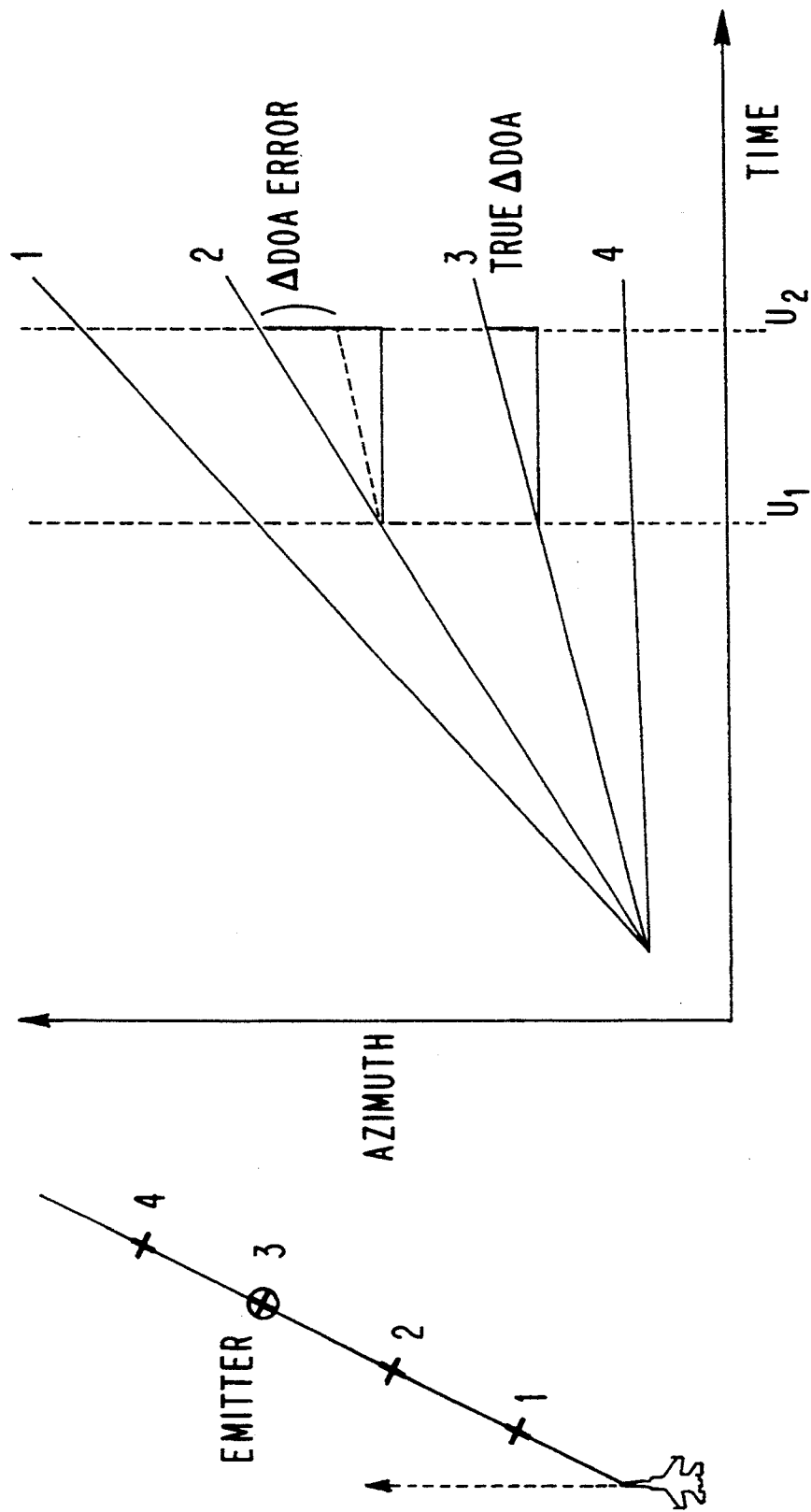
FIG. 6(c) schematically shows various azimuth rates of change predicted by the different range partitions, illustrating the relationship between emitter update time and DOA-change error.

Correct resolution of the integer ambiguity depends on the rate, or slope of the azimuth change between iterations calculating updated ranges. FIG. 6(c) indicates the various azimuth rates predicted by the different range partitions. Note that the prediction error, ΔDOA, must be large enough to create gross error, i.e. cause an incorrect $2\pi$ addition to $\Delta\phi_{LBI}$ ambiguity resolution, for a filter in that range bin to not converge to the correct answer. Inequality 15 describes the relationship between emitter update rate, range partition, and observer motion that must be satisfied for ΔDOA to not give a gross error. This requirement is not very stringent, and hence many initially incorrect range partitions lead to the correct emitter location, as shown in FIG. 3b.

The approach of this invention is very robust since choosing the correct estimate is straight forward. In many cases simple majority logic can be used. A Bayesian hypothesis test is shown in FIGS. 3(a) and 3(b) as a means of further improving the range estimate by performing a weighted average over all the filter outputs.

FIG. 7 shows a flowchart of the invention. If input data into step 701 is the first measured AOA, then initialization of the apparatus proceeds at step 703. Step 703 generates N initial range partitions along the measured AOA as part of the initialization process, using the AOA input data and the present aircraft position, which is provided through path 705. These N hypothesized emitter locations are stored in data buffer 707 via path 709. Step 711 uses both data received from inertial navigation system (INS) 715 via path 717 as well as the N emitter locations from data buffer 707 via path 719 and outputs unit vectors $\bar{u}$ for each of the N hypothesized emitter locations. If initialization is ongoing, then these are the initial unit vectors calculated. A predicted LBI phase is calculated for each range partition in step 721 using the unit vectors and the aircraft attitude from INS 715 received via path 723. The predicted phases are stored in data buffer 707 via path 725.

If the initialization process is continuing, i.e. the answer to steps 701 and 727 is yes, then the N location algorithms are initialized with the AOA measurement. Otherwise, $\Delta\phi_{MEAS}=(\phi_{MEASK}-\phi_{MEASK-a})$ is differentially resolved using $\Delta\phi_{PRED}=(\phi_{PREDK}-\phi_{PREDK-1})$, generated via equation 10, for each range partition using data received from data buffer 707 via paths 729 and 731. In step 735 N emitter locations are calculated using the N azimuths provided from 733 and using the optimal estimator. The updated emitter locations are transmitted on signal line 739, stored in data buffer 707 and subsequently used in calculating the next unit vectors in step 711. The steps between 711 and 735 are repeated until emitter range is determined. The Range Processor outputs the estimated emitter range in step 737 using a hypothesis test, e.g. a Bayesian hypothesis test.

Figure 8:
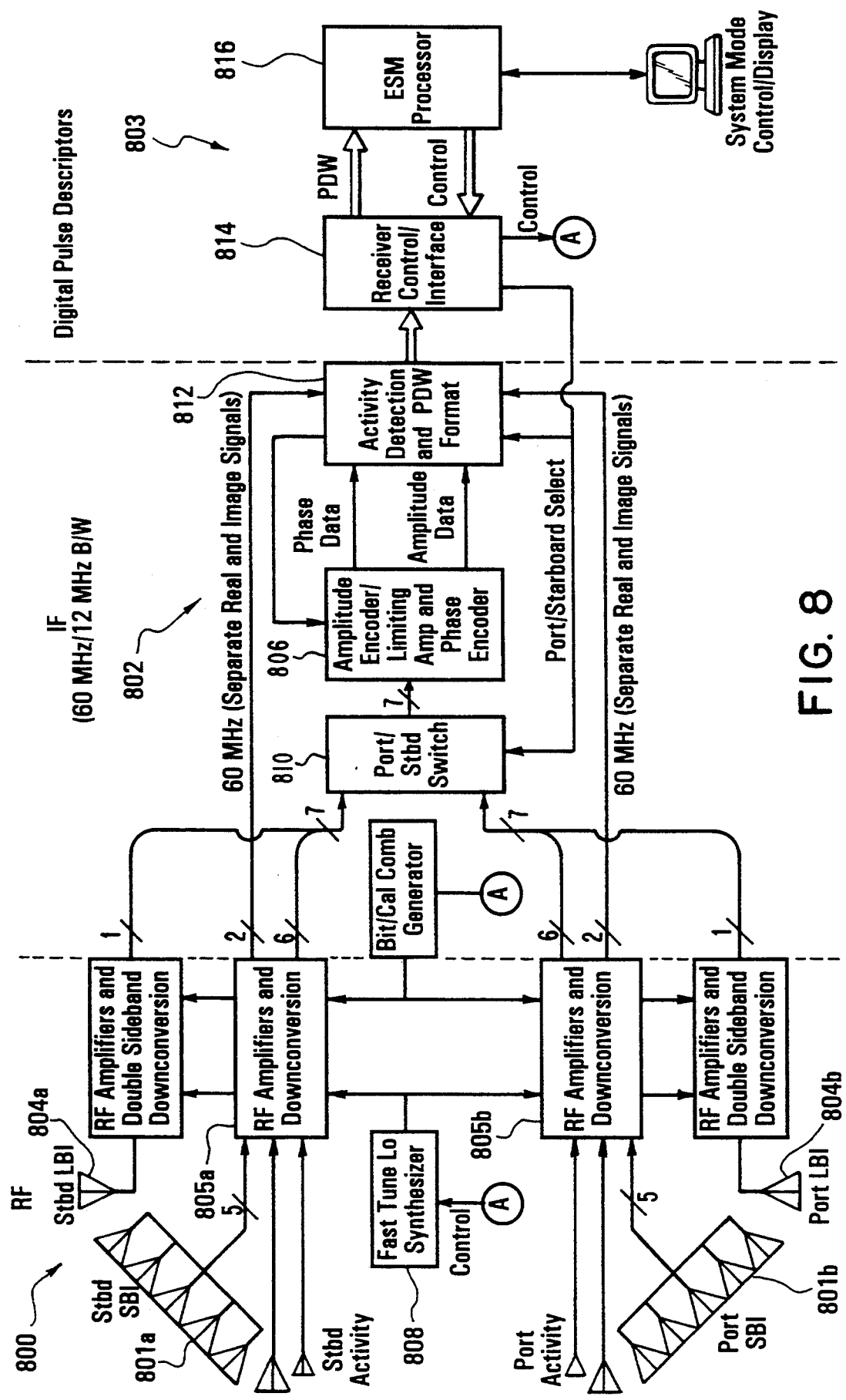
FIG. 8 shows one embodiment of the apparatus for performing range estimation.

FIG. 8 illustrates one embodiment of the invention described above, showing the three major functional areas. The antenna region 800 converts the RF waves in free space to signals travelling along transmission lines. The intermediate frequency (IF) area 802, shows a hardware realization that measures the relative phase shift between two antenna elements. Finally, the processor area 803 can be any computing device capable of running the AOA/LBI algorithm.

As shown in this embodiment, the initial AOA measurement is derived from the port and starboard SBIs 801a and 801b. As previously noted, the SBI measurement can be substituted with a number of other AOA measuring apparatus. All subsequent LBI measurements are derived from either of the Port/Starboard LBI elements 804a and 804b and one additional element among the SBI elements. Any element among the SBI elements can be used. However, since the performance is a function of the LBI length, the SBI element providing the widest LBI spacing is preferred.

The signal processing flow from the antennas 800 to the processor block 803 is identical for the initial AOA and subsequent LBI measurements. The signal processing flow is as follows.

The incoming RF signal is intercepted by the antennas and channelled into the "RF amplifiers and Downconversion" block 805a and 805b where the signal is amplified and downconverted from RF frequency (typically 2-18 GHz) to an IF of typically 60 MHz. The frequency ranges noted are typical ranges and successful practice of this invention is not restricted to those specified ranges.

Downconversion is achieved by "mixing" the RF signal with an IF source 808, the Fast Tune Local Oscillator Synthesizer. The IF signals are then directed into the "Port/Starboard Switch" 810 which exists in typical systems to provide wide field-of-view (FOV) coverage by employing multiple antenna sets. In this configuration, the switch 810 compares the signal amplitude from the Port and Starboard sectors and accepts the IF signal with the greatest amplitude. The signal is then directed into the "Amplitude Encoder/Limiting Amp and Phase Encoder" 806 in which signal parameter measurements are made. The relative phase difference between a pair of antenna elements is determined.

From this point the signal is directed into "activity Detection and PDW (Pulse Descriptor Word) Format" block 812. Activity detection validates the signal based on amplitude and "PDW Format" puts the measured data (phase amplitude, frequency, etc) into a format readable by the processor. The signal passes through the "Receiver Control/Interface" 814, which is a system configuration specific block not required to implement the AOA/LBI technique. The final element is the ESM (Electronic Support and Measurement) Processor" 816, which contains the CPU and software to implement the AOA/LBI technique. It will be known to those of ordinary skill that unit vector generators 20, resolvers 30, range processors 40 and hypothesis tester 50 can be realized in individual processors or in a single processor using centralized or distributed processing as may be appropriate to a given application.

This invention can be utilized in a variety of embodiments to achieve a variety of outputs. For example, this invention can be utilized to generate target elevation without the use of an elevation array. This particular embodiment requires an assumption about the earth's surface, e.g. bald earth, or a terrain map.

The foregoing description is intended to illustrate the invention but is not intended to limit the scope of the protection being sought. Numerous modifications can be made to the above described methods and apparatus without departing from the scope of the claims set forth below.

What is claimed is:

1. A method for determining an emitter range using a long baseline interferometer (LBI), comprising the steps of:
   (i) determining a single angle of arrival (AOA) of an emitter signal with an AOA detection device and outputting an AOA signal;
   (ii) generating a plurality of initial range partitions, each partition having an initial assumed emitter position along said angle of arrival, using said AOA signal output from said AOA detection device;
   (iii) performing an initial prediction of phase change of said emitter signal between elements of said LBI based on said initial plurality of assumed emitter positions;
   (iv) measuring sequential LBI phase changes with phase change circuitry, said circuitry receiving emitter signals from said elements of said LBI;
   (v) differentially resolving each of said measured LBI phase changes with said predicted LBI phase changes and generating a plurality of resolved phase signals, thereby providing an azimuth for each of said partitions;
   (vi) at each measured phase change, generating a signal representing an estimated emitter location for each of said assumed emitter positions;
   (vii) predicting subsequent LBI phase changes for each said estimated emitter location using said estimated emitter location;
   (viii) differentially resolving said measured LBI phase changes with said subsequent LBI phase changes, generating a new azimuth for each partition and repeating steps vi, vii and viii, until a predetermined range criterion is met; and
   (ix) generating a signal indicating a best range estimate as the emitter location from the plurality of estimated emitter locations generated.

2. A method for determining an emitter range according to claim 1 wherein said AOA detection device determines said angle of arrival by at least one of an amplitude DF measurement, an SBI, and an azimuth hypothesis test.

3. A method for determining an emitter range according to claim 1 wherein the step of determining a best range estimate is based on statistical properties of each said estimated emitter location.

4. A method for determining an emitter range according to claim 1 wherein the step of generating said estimated emitter location utilizes an optimal estimator.

5. A method for determining an emitter range according to claim 4 wherein said optimal estimator is a Kalman filter implemented in any convenient coordinate system.

6. A method for determining an emitter range according to claim 1 further comprising the step of generating a direction of arrival (DOA) unit vector for each assumed emitter position based on said angle of arrival.

7. A method for determining an emitter range according to claim 1 wherein said initial range partitions satisfying the inequality:

$$\frac{r_t}{1 - \frac{d}{\lambda} \Delta a \sin(\overline{a} + a) \left[ 1 - a \cos(a) \frac{v_\perp \Delta t}{r_t} \right]} \geq \Delta r \geq$$

$$\frac{r_t}{1 + \frac{d}{\lambda} \Delta a \sin(\overline{a} + a) \left[ 1 - a \cos(a) \frac{v_\perp \Delta t}{r_t} \right]}$$

where
$\overline{a}$ = fixed DOA bias,
$a$ = true emitter bearing,
$v_\perp$ = velocity component perpendicular to emitter bearing,
$\Delta t$ = update time between measurements,
$\Delta a$ = bearing change during update time,
$d$ = interferometer baseline length, and
$r_t$ = true range,
all converge to the correct range estimate.

8. A method for determining the location of an emitter comprising the steps of:
   generating a plurality of initial unit vectors representing a set of ambiguous possible emitter locations along a measured initial angle of arrival;

resolving LBI phase ambiguities using a predicted emitter location;
performing range estimates for each LBI measurement received;
assigning to each said possible emitter location a probability that it is the correct emitter location;
resolving phax ambiguity; and
choosing the correct emitter location with probability one.

9. A method for determining an emitter range using a long baseline interferometer (LBI), comprising the steps of:
determining an angle of arrival (AOA) of an emitter signal once;
generating a plurality of range partitions corresponding to a plurality of assumed emitter positions along said angle of arrival;
computing a plurality of predicted LBI phase changes for each assumed emitter position;
measuring LBI phase changes of said emitter signal;
differentially resolving each of said measured LBI phase changes with said predicted LBI phase changes;
generating a plurality of emitter location estimates using optimal estimators for each partition;
weighting a location estimate based on statistical properties of the optimal estimators; and
choosing a best estimate as the emitter location from the plurality of emitter locations generated.

10. A method for determining an emitter range using a long baseline interferometer (LBI), comprising the steps of:
determining an angle of arrival (AOA) of an emitter signal once;
generating a plurality of range partitions corresponding to a plurality of assumed emitter positions along said angle of arrival;
generating a plurality of predicted LBI phase changes for each assumed emitter position;
determining a sequence of LBI phase changes;
differentially resolving each of said determined LBI phase changes with said predicted LBI phase changes;
generating a plurality of emitter locations using optimal estimators for each partition;
weighting a location estimate based on statistical properties of the optimal estimators; and
choosing a best estimate as the emitter location from the plurality of emitter locations generated.

11. An apparatus for determining an emitter range, comprising:
a long baseline interferometer;
means for measuring an angle of arrival (AOA) only once;
means for converting RF energy from said emitter received by said long baseline interferometer and said measuring means to an intermediate frequency signal;
means for determining LBI phase change of said emitter signal at antenna elements of said LBI using said intermediate frequency signal;
means for generating a plurality of assumed emitter positions along said angle of arrival;
means for computing a plurality of predicted LBI phase changes for each assumed emitter position;
means for differentially resolving said LBI phase change with said predicted LBI phase changes;
means for generating a plurality of emitter locations using an optimal estimator algorithm; and
means for generating a range estimate based on said emitter locations generated.

* * * * *